United States Patent Office 3,585,181
Patented June 15, 1971

3,585,181
METAL CONTAINING MONOAZO REACTIVE DYESTUFFS
Horst Jager, Cologne-Muelheim, Karl-Heinz Schundehutte, Opladen, and Heinz Machatzke, Leverkusen, Germany, assignors to Farbenfabriken Bayer Aktiengesellschaft, Leverkusen, Germany
No Drawing. Continuation of application Ser. No. 538,547, Mar. 30, 1966. This application Aug. 7, 1969, Ser. No. 849,600
Int. Cl. C09b 62/00; D06p 1/02
U.S. Cl. 260—146
7 Claims

ABSTRACT OF THE DISCLOSURE

Fiber reactive dyestuffs of the formula

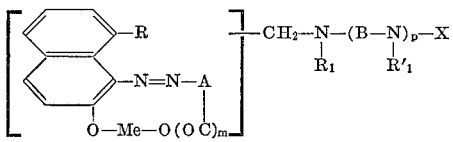

in which

R is hydroxyl or acylamino;
A is an aromatic-heterocyclic or aromatic-carboxylic radical in which the group —(CO)$_m$O— is in the adjacent position to the azo grouping;
$m$ is 0 or 1;
Me is a complex-bound metal;
$R_1$ and $R'_1$ are hydrogen or alkyl;
B is a bridge member;
$p$ is 0 or 1; and
$x$ is a fiber reactive group.

The dyestuffs are prepared by reacting the corresponding amino azo dyestuffs (containing no X substituent) with a compound Hal—X in which Hal is halogen and X is a fiber reactive moiety.

---

This application is a continuation of Ser. No. 538,547, filed Mar. 30, 1966, now abandoned.

The present invention is concerned with new valuable metal-containing reactive dyestuffs of the general formula

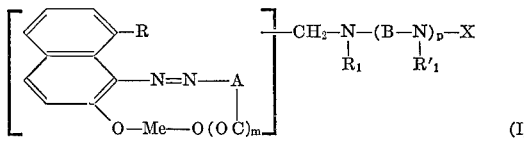  (I)

In this formula R means a hydroxyl group or an acylamino group, A an aromatic-heterocyclic or aromatic-carbocyclic radical in which the group —(CO)$_m$O— is in the adjacent position to the azo grouping, $m$ means the number 0 or 1, Me the radical of a complex-bound metal, $R_1$ and $R'_1$ a hydrogen atom or an alkyl radical, B a bridge member, $p$ the number 0 or 1, and X a reactive group.

The dyestuffs I may moreover contain any substituents customary in azo dyestuffs, such as sulphonic acid, carboxylic acid, carboxylic acid ester, sulphonamide, carbonamide, alkyl, alkoxy, nitro or halogen groups, such as chlorine or bromine, cyano, aryl, amino or substituted amino groups, such as alkylamino, aralkylamino, arylamino, acylamino groups and further azo groupings. The naphthalene nucleus on the left of the general formula contains, as preferred substituents, one or several sulphonic acid groups.

The term a reactive group X, includes, as is usual in the chemistry of reactive dyestuffs, a grouping which contains a labile substituent or a reactive grouping capable of reacting with hydroxyl or amide groups of fibre materials with the formation of a covalent bond. Of the great number of the reactive groups X to be considered, the following examples may be mentioned:

2,4-dichlorotriazinyl-6-,
2-methyl-4-chlorotriazinyl-6-,
2-amino-4-chlorotriazinyl-6-,
2-methoxy-4-chlorotriazinyl-6-,
2-sulphophenylamino-4-chlorotriazinyl-6-,
2-phenoxy-4-chlorotriazinyl-6-,
2,4-dichloropyrimidyl-6-,
2,4,5-trichloropyrimidyl-6-,
2-methylsulphonyl-6-methylpyrimidyl-4-,
2,3-dichloroquinoxaline-6-carbonyl-,
2,3-dichloroquinoxaline-6-sulphonyl-,
2-monochloroquinoxaline-6-carbonyl-,
2-chlorobenzothiazole-5-carbonyl- or -6-carbonyl-,
2-methylsulphonyl-benzothiazole-5-carbonyl- or -6-carbonyl-,
2-phenylsulphonylbenzo-thiazole-5-carbonyl- or -6-carbonyl-,
2-methylsulphonylbenzo-thiazole-5-sulphonyl- or -6-sulphonyl-,
2-chlorobenzoxazole-5-carbonyl- or -6-carbonyl-,
2-chloro-1-methyl-benzimidazole-5- or -6-carbonyl,
2,4-dichloropyrimidine-5- or -6-carbonyl-,
2,4-bis-methylsulphonyl-pyrimidine-5- or -6-carbonyl-groups, the bromine derivatives of the chlorine compounds mentioned, furthermore the acryloyl, β-chloropropionyl, β-phenyl- and β-methyl-sulphonyl - propionyl, β - bromopropionyl, the vinyl-sulphonyl group, the β-sulphatopropionyl- and β-oxethyl-sulphone-sulphuric acid semiester grouping or a 1,4-dihalophthalazine-6-carbonyl or -6-sulphonyl radical.

Suitable acylamino groups R are, inter alia, acetylamino, chloroacetylamino, benzoylamino, benzene-sulphonylamino and alkyl-sulphonylamino groups.

Alkyl radicals $R_1$ and $R'_1$ are mainly those with 1–4 carbon atoms, such as $CH_3$—, $C_2H_5$—, $C_3H_7$—.

Bridge members B which if $p$ is 1, stand between the aminomethylene group and the reactive radicals X, are those of aliphatic nature, which may be interrupted by further heteroatoms, and also those of aromatic nature; the following may be mentioned by way of example:

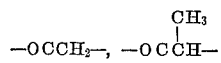

Of the complex-bound metal atoms Me, complex-bound copper is preferred.

The new dyestuffs are produced by conventional methods by condensation and/or metallisation. Various methods of procedure may be employed for this purpose. In the simplest and generally preferred case, an aminoazo dyestuff of the formula

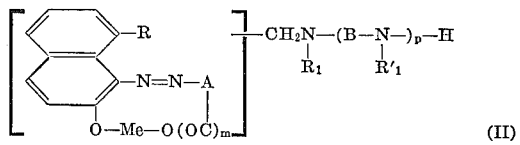  (II)

is reacted at the terminal amino group with a suitable reactive component which introduces the radical X. Reactive components of this type are, for example 2,4,6-trihalotriazines, 2,4-dihalo-6-amino- or substituted-aminotriazines, tri- or tetra-halopyrimidines, 2-methylsulphonyl-4 - chloro - 6 - methyl - pyrimidine, 2,4 - bismethylsulphonyl - 6 - methyl-pyrimidine, 2,3 - dihaloquinoxaline-6 - carboxylic acid halides, such as 2,3 - dichloroquinoxaline - 6 - sulphonic acid chloride, 2-monochloroquinoxaline - 6 - carboxylic acid chloride, 2-chlorobenzothiazole-5- or -6 - carboxylic acid chloride, 2-chlorobenzothiazole-5- or -6 - sulphonic acid chloride, 2 - methylsulphonyl-benzothiazole - 5- or -6-carboxylic acid chloride, 2-methylsulphonylbenzothiazole - 5- or -6-sulphonic acid chloride, 2 - methylsulfonyl - 4,5 - dichloro - 6 - methylpyrimidine, 2,4 - dichloropyrimidine - 5- or -6-carboxylic acid chloride, 2,4 - bis-methylsulphonyl-pyrimidine-5- or -6-carboxylic acid chloride, β-chloropropionic acid chloride, β-methylsulphonyl-propionic acid chloride, β-bromopropionic acid chloride and carbyl sulphate, furthermore the bromine derivatives of the above-mentioned acid chlorides. Among the halogen derivatives, the chlorine derivatives are preferred, e.g. cyanuric chloride, tri- or tetra-chloropyrimidine, 2,3-dichloroquinoxaline - 6 - carboxylic acid chloride etc. In the Formula II, R, A, Me, $m$, B, $R_1$, $R'_1$ and $p$ have the above-given meaning.

The reaction of the aminoazo dyestuffs II with the reactive components which introduce the radical X is generally an acylation reaction which is preferably carried out in a neutral to weakly alkaline medium. The reactive components contain at least two reactive radicals, one of which is retained in the radical X under the conditions of the reaction.

In the aminoazo dyestuff II required for the reaction, the grouping

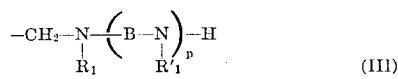

(III)

may be in the naphthalene radical on the left side of the general Formula II as well as in the radical A of this formula.

However, the new dyestuffs can also be prepared in such a manner that dyestuffs of the formula

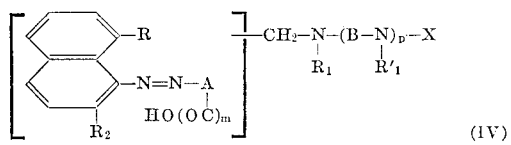

(IV)

in which R, A, $m$, $R_1$, $R'_1$, B, $p$ and X have the above-given meaning and $R_2$ stands for H or OH, are metallised and, if $R_2$ is a hydrogen atom, the metallisation is carried out under the conditions of oxidising coppering.

The metallisation is carried out in known manner with metal salts, preferably of copper, chromium or cobalt, and the oxidising coppering also by known methods.

The metal-containing initial dyestuffs of the Formula II employed for the reaction with reactive components can be prepared, for example, according to the process described by Einhorn (Liebig's Ann. Chem. 343,207 [1905] and Tscherniac, Friedländer, VI, page 143 and VI, page 145) from metal-containing monoazo dyestuffs of the formula

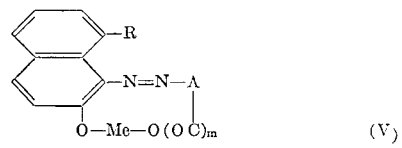

(V)

With the aid of this reaction it is possible to introduce into dyestuffs of the Formula V acylated groupings of the Formula III in which $p$ is 0 and, as acyl radicals, the acetyl, benzoyl and chloroacetyl group may be mentioned in particular. By splitting off the acyl radical by means of hydrolysis, the starting dyestuffs II are then finally obtained which are used for the condensation with the reactive components. If, by the reaction according to Einhorn and Tscherniac, a chloroacetylated amino group III, in which $p$ is 0, is obtained, the terminal chlorine atom can be exchanged, for example, for an alkylamino group and acylatable groupings III, where $p$ is 1, e.g. of the formula $-CH_2NHCOCH_2NHR_1$, can thus be introduced.

Starting dyestuffs of the Formula V are produced in known manner from appropriate diazo and azo components, for example in that diazotised peri-aminonaphthol or a diazotised peri-aminonaphtholsulphonic acid, expediently in the form of its O-acyl compound, e.g. in the form of the O-arylsulphonic acid ester, is coupled with an azo component in the adjacent position to a hydroxy group and the dyestuff thus obtained is then subjected to oxidising coppering. Azo components A—OH suitable for this reaction are, for example, resorcinol, dihydroxy-naphthalenes, dihydroxy-naphthalene-sulphonic acids, 3 - amino - 1 - hydroxybenzene, 4-acylamino - 1 - hydroxybenzenes, p-cresol, 5 - pyrazolones, such as 3 - methyl - 5 - pyrazolone, 1-phenyl-3-methyl-5 - pyrazolone, 1 - alkylphenyl - 3 - methyl - 5 - pyrazolones, 1 - alkoxyphenyl - 3 - methyl - 5 - pyrazolones and their sulphonic acids; furthermore hydroxynaphthalenes, such as β-naphthol, α-naphthol and their derivatives, such as 1 - hydroxynaphthalene - 4 - sulphonic acid, 1 - hydroxynaphthalene - 5 - sulphonic acid, 1-hydroxynaphthalene - 8 - sulphonic acid, 1 - hydroxynaphthalene - 4,8 - disulphonic acid, 1 - hydroxy - 6-acylamino-naphthalene - 4,8 - disulphonic acid, 2 - hydroxynaphthalene - 3 - carboxylic acid, 2 - hydroxynaphthalene - 6 - sulphonic acid, 2 - hydroxynaphthalene-5 - sulphonic acid, 2 - hydroxynaphthalene - 7-sulphonic acid, 2 - hydroxynaphthalene-3,6-disulphonic acid, 1-hydroxy-8-acetaminonaphthalene-5-sulphonic acid.

The starting dyestuffs V can also be synthetised in such a manner that diazonium compound of the benzene or naphthalene series, which may contain a hydroxyl or carboxyl group in the o-position to the diazo group, is coupled with a 2,8-dihydroxynaphthalene or a 2-hydroxy-8-acylaminonaphthalene compound and subsequently metallised and, if the diazo component contains no metal complex-forming grouping in the o-position to the diazo group, oxidising coppering has to be carried out.

Depending upon the method of preparation, the initial dyestuffs II may contain one or several groupings of the Formula III. These groupings can be introduced into the pre-formed dyestuffs V or also into the diazo or coupling components used.

Some of the starting dyestuffs V are known, for example from Belgian patent specification No. 626,035.

The dyestuffs obtainable according to the present process are new. They are suitable as reactive dyestuffs, preferably for the dyeing and printing of hydroxyl or amide group-containing materials, such as textile fibres, threads and fabrics of wool, silk synthetic superpolyamide and polyurethane fibres, especially of natural and regenerated cellulose. The dyestuffs are applied to these materials according to the methods known for reactive dyestuffs, in the presence of acid-binding agents and with the action of heat, if necessary.

In the following examples, which are given for the purpose of illustrating the present invention, parts are parts by weight; temperatures are given in degrees centigrade.

EXAMPLE 1

0.1 mol of the copper complex compound of the dyestuff of the probable formula

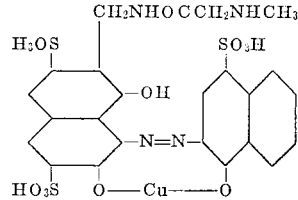

is dissolved in 400 parts by volume water at 30–40° and a pH of 7 and mixed at this temperature with a suspension of 28 parts 2,3-dichloroquinoxaline-6-carboxylic acid chloride. During the condensation, a pH value of 7–8 is maintained by the addition of a sodium carbonate solution. When the reaction is completed, the dyestuff is precipitated by the addition of potassium chloride and isolated. After drying, the dyestuff is a dark powder which dissolves in water with a blue colour and dyes cotton, in the presence of acid-binding agents, in fast blue shades.

If in this example, instead of the reactive component 2,3-dichloroquinoxaline-6-carboxylic acid chloride, the equivalent quantities of 2-methylsulphonyl-benzothiazole-5-carboxylic acid chloride,
2-chlorobenzothiazole-5-carboxylic acid chloride,
cyanuric chloride,
4-amino-2,6-dichlorotriazine,
tetrachloro-pyrimidine,
β-methyl-sulphonyl-propionic acid chloride,
β-chloroproprionic acid chloride,
1,4-dichlorophthalazine-6-carboxylic acid chloride or
2-methyl-sulphonyl-4-chloro-6-methyl-pyrimidine or
2-methylsulfonyl-4,5-dichloro-6-methylpyrimidine are used and the reaction is otherwise carried out in an analogous manner, maintaining a reaction temperature customary for the reaction component, valuable dyestuffs are likewise obtained which yield by one of the methods of application usual for reactive dyestuffs intense and very clear blue shades.

The product used in this example as initial dyestuff can be prepared by the following method:

63.2 parts of the dyestuff of the formula

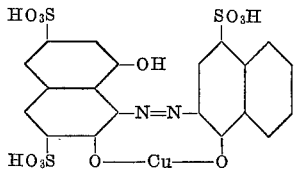

are dissolved in 450 parts 96% sulphuric acid, while cooling with ice. With stirring and cooling by means of an ice bath, 18.5 parts finely powdered methylolchloro-acetamide are introduced. The mixture is stirred for 12 hours at 10–15° C. and then poured onto 1500 parts ice. The dyestuff is precipitated by the addition of 75 parts sodium chloride. After suction filtration, the dyestuff is dissolved in 1000 parts water, adjusted to pH 7 and again precipitated with sodium chloride. The dyestuff probably corresponds to the following formula

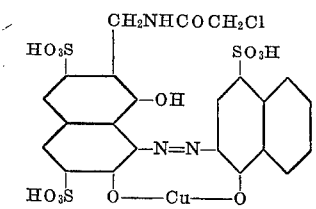

The moist paste of this dyestuff is stirred for 24–48 hours at room temperature with 100 parts of a 25% methylamine solution and 100 parts water. The pH value is adjusted to 5 by the addition of concentrated hydrochloric acid and the dyestuff thus precipitated. Before acylation, the dyestuff is after-coppered with copper sulphate. A dyestuff is then obtained which, in the form of its free acid, presumably corresponds to the following formula:

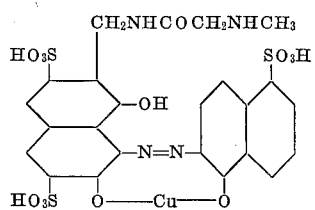

If in this example the following starting dyestuffs are used one obtains likewise valuable fiber reactive dyestuffs which dye cotton in the indicated shades having very good fastness properties.

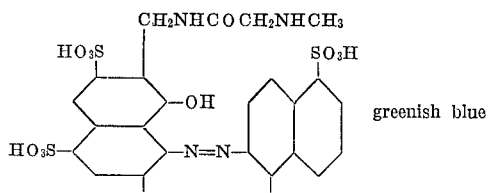
greenish blue

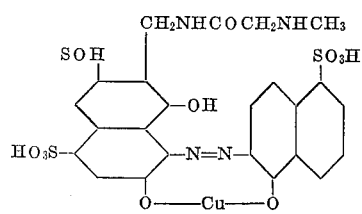
greenish blue

EXAMPLE 2

71 parts of the dyestuff which, in the form of the free acid, corresponds to the following formula:

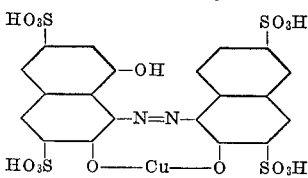

are dissolved, while cooling with ice, in 700 parts 96% sulphuric acid. While stirring and cooling with ice, 25 parts methylol-chloro-acetamide are added. After 5 hours, the mixture is poured onto ice and the dyestuff precipitated by the addition of sodium chloride. After filtration, the paste is diluted with water, buffered with sodium acetate and the metal complex produced by the addition of copper sulphate. The dyestuff is salted out and filtered off with suction.

The resultant paste is stirred at room temperature for 24–28 hours with 100 parts of a 25% methylamine solution and 100 parts water adjusted with hydrochloric acid to pH 5 and the dyestuff isolated.

The product thus obtained probably corresponds to the following formula:

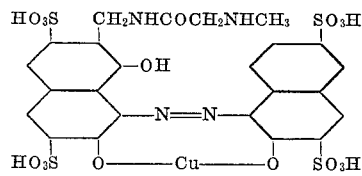

The paste of this dyestuff is dissolved in 600 parts water, 28 parts 2,3-dichloroquinoxaline-carboxylic acid chloride are strewn in at 35–40°, and a pH value between 7 and 8 is maintained by the addition of 10.8 parts sodium carbonate dissolved in water. When the acylation is completed, the product is clarified and the dyestuff salted out. After drying, a dark powder is obtained which dissolves in water with a blue colour and dyes cotton in fast blue shades.

EXAMPLE 3

0.1 mol of the copper complex compound of the formula

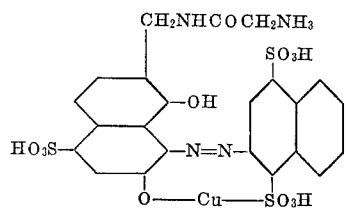

(prepared by coupling diazotised 1-amino-2-bromo-8-benzene-sulphonyl-hydroxynaphthalene sulphonic acid-4 with the equivalent quantity of 1-hydroxynaphthalene-disulphonic acid-4,8, converting the monoazo compound into the copper complex by the methods of dehalogenating coppering, hydrolysis of the benzene-sulphonyl group, reaction with methylol-chloroacetamide, exchanging the chlorine atom for a methylamine radical and after-coppering) is dissolved in 600 parts water at pH 6, mixed at 35–40° with 28 parts 2,3-dichloroquinoxaline-6-carboxylic acid chloride; 10.8 parts sodium carbonate dissolved in water are added dropwise maintaining the pH value at 7–8. When the condensation is completed, the mixture is clarified and the filtrate salted out.

After drying at 40–50°, a dark powder is obtained which dissolves in water with a blue colour and dyes cotton in fast blue shades.

EXAMPLE 4

0.1 mol of the copper complex compound of the formula

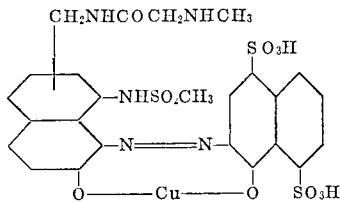

(prepared by coupling 2 - aminonaphthalene-sulphonic acid-4,8- with 1 - methyl-sulphonylamino - 7-hydroxy-naphthalene, conversion into the copper complex, reaction with methylol-chloroacetamide, exchange of the chlorine atom for a —NHCH₃ group and after-coppering) is dissolved in 1000 parts water at pH 6 and 35–40° C., 28 parts 2,3 - dichloroquinoxaline-6-carboxylic acid chloride are sprinkled in and the pH value is maintained between 7 and 8 by the addition of 10.8 parts sodium carbonate. When this amount of sodium carbonate is used up, the condensation is completed. After clarification, salting out and drying, a dark powder is obtained which dissolves in water with a blue colour and dyes cotton in fast blue shades.

EXAMPLE 5

0.1 mol of the copper complex compound which corresponds to the presumable formula

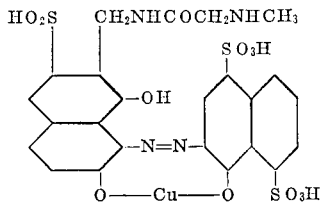

are dissolved in 600 parts by volume of water at 50° C. and at a pH 6. A suspension of 28 parts of 2,3-dichloro-quinoxaline-6-carboxylic acid chloride is added. A pH-value of 7–8 is kept constant during the condensation reaction while adding soda. After completion of the reaction the mixture is clarified and the dyestuff precipitated by the addition of potassium chloride and the dyestuff isolated. It dissolves in water with blue colouration and dyes cotton in the presence of acid binding materials such as sodium hydroxide or sodium carbonate greenish blue shades.

The initial dyestuff used in this example can be prepared as follows: 2-amino-8-hydroxy-naphthalene-6-sulfonic acid is condensed with methylolchloracetamide in concentrated sulphuric acid in accordance with the method of Einhorn and Tscherniac; the product of the probable formula:

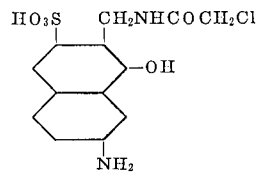

is thus obtained. This reaction product is coupled in acidic solution with diazotized 2-amino-naphthalene-4.8-disulfonic acid whereupon a red dyestuff of the probable constitution

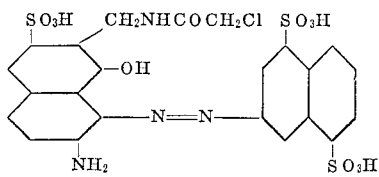

is formed. In this aminoazo-dyestuff the amino group is replaced by a hydroxyl group upon diazotization in acidic medium. The copper complex compound of the o-hydroxy-azo-dyestuff is prepared by the method of oxidative coopering. The copper complex thus obtained has the following formula:

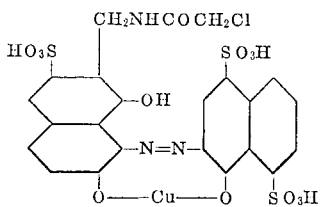

In a subsequent step the chlorine atom in the chloro-acetylamino group is replaced by a —NHCH₃ group.

If in this example the 2-amino-8 - hydroxy-naphthalene-6-sulfonic acid is replaced by the equivalent amount of 2-amino-8-hydroxy-naphthalene-3.6 - disulfonic acid another valuable blue reactive dyestuff is obtained. If using 2-amino-naphthalene-4.6.8 - trisulfonic acid or 2-amino-naphthalene-5.7-disulfonic acid in place of 2-amino-naphthalene-4.8-disulfonic acid further valuable blue fibre reactive dyestuffs are obtainable.

It is to be understood, that all fibre reactive compounds may be used for the process of introducing the reactive grouping X into the novel dyestuffs, such as 2.4.6-trihalotriazines, 2.4 - dihalo-6-amino or -6-substituted aminotriazines, tri- or tetrahalopyrimidines, 2 - methyl-sulphonyl-4-chloro-6-methyl - pyrimidine, 2.4 - bis - methyl-sulphonyl - 6-methyl-pyridine, 2.3 - dihaloquinoxaline-6-carboxylic acid halides and -6-sulphonic acid halides. 2-chloroquinoxaline - 6-carboxylic acid halides, 2 - halo-benzothiazole-5- or -6 - carboxylic acid halides, 2 - halo-benzothiazole-5 or -6-sulphonic acid halides, 2-methyl-sulphonyl-benzothiazole-5- or -6-carboxylic acid halides, 2 - methyl - sulphonyl - benzothiazole-5- or -6-sulphonic acid halides, 2.4 - dichloropyrimidine-5- or 6-carboxylic acid halides, 2.4 - bis-methyl-sulphonyl-pyrimidine-5- or -6-carboxylic acid halides, 1.4 - dihalo-phthalazine-6-carboxylic acid chloride, β-halopropionic acid halides, β-methyl-sulphonyl-propionic acid halides or carbyl sulphate wherein halogen is bromine or, preferably, chlorine.

We claim:
1. A reactive dyestuff of the formula

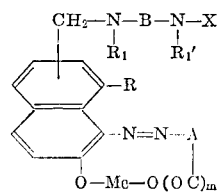

wherein R is hydroxyl or an acylamino group selected from acetylamino, chloroacetylamino, benzoylamino, benzene-sulfonylamino, and methyl-sulfonylamino groups;

A is a coupling component which is an aromatic compound selected from the group consisting of hydroxybenzenes, hydroxynaphthalenes, p-cresol, and hydroxynaphthalenes substituted with sulfonic acid, NH₂ or acetamino groups, or a heterocyclic compound selected from the group consisting of unsubstituted and sulfonic acid substituted 3-methyl-5-pyrazolone or 1 - phenyl - 3 - methyl-5-pyrazolone, wherein A contains the substituent —(CO)$_m$O— attached to the aromatic nucleus of said aromatic residue or the heterocyclic nucleus of said heterocyclic residue in adjacent position to the azo bridge; $m$ is 0 or 1; Me is Cu, Co, or Cr; R₁ and R′₁ are hydrogen or lower alkyl; B is

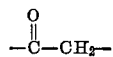

or

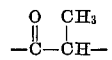

X is selected from the group consisting of unsubstituted halotriazinyl; substituted halotriazinyl wherein the substituents are methyl, —NH₂, methoxy, sulphophenylamino or phenoxy; unsubstituted halo pyrimidinyl; unsubstituted halo pyrimidine-carbonyl; substituted pyrimidinyl wherein the substituents are lower alkyl-sulphonyl and methyl, or lower alkyl-sulphonyl and carbonyl; unsubstituted 2,3-dihaloquinoxaline-6-carbonyl- or -6-sulfonyl; unsubstituted 2-halobenzothiazole-5-carbonyl- or -6-carbonyl; unsubstituted 2-halobenzothiazole-5-sulfonyl- or -6 - sulfonyl; unsubstituted 2-lower alkyl-sulfonyl-benzothiazole-5-carbonyl- or -6-carbonyl; unsubstituted 2-phenylsulfonyl-benzothiazole-5-carbonyl- or -6-carbonyl; unsubstituted 2-lower alkyl-sulfonylbenzothiazole-5-sulfonyl- or -6-sulfonyl; unsubstituted 1,4-dihalo-phthalazine - 6 - carbonyl; unsubstituted β-halo-propionyl; unsubstituted β-lower alkyl-sulphonyl-propionyl; unsubstituted haloacryloyl; unsubstituted β-sulfato propionyl; and unsubstituted β-oxethyl-sulfone sulfuric acid semi-ester; wherein said halo group is chloro or bromo.

2. A dyestuff of the formula:

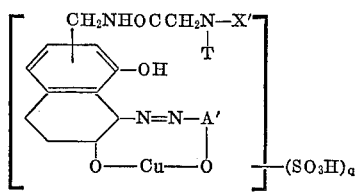

wherein A′ is naphthylene bearing the copper complex-bound hydroxyl group in a position adjacent to the azo grouping; T is lower alkyl; $q$ is an integer from 1 to 4; X′ is selected from the group consisting of unsubstituted halotriazinyl; substituted halotriazinyl wherein the substituents are methyl, —NH₂, methoxy, sulphophenylamino or phenoxy; unsubstituted halo-pyrimidinyl; unsubstituted halo pyrimidine carbonyl; substituted pyrimidinyl wherein the substituents are lower alkyl-sulphonyl and methyl, or lower alkyl-sulphonyl and carbonyl; unsubstituted 2,3-dihaloquinoxaline-6-carbonyl- or -6-sulphonyl; unsubstituted 2-halobenzothiazole-5-carbonyl- or -6-carbonyl; unsubstituted 2-halobenzothiazole-5-sulphonyl- or -6-sulphonyl; unsubstituted 2-lower alkyl-sulphonyl-benzothiazole - 5 - carbonyl- or -6-carbonyl; unsubstituted 2-phenyl-sulphonyl-benzothiazole - 5 - carbonyl - or - 6 - carbonyl; unsubstituted 2-lower alkyl-sulphonyl-benzothiazole-5-sulphonyl- or -6-sulphonyl; unsubstituted 1,4-dihalo-phthalazine-6-carbonyl; unsubstituted β-halopropionyl; unsubstituted β-lower alkyl-sulphonyl-propionyl; unsubstituted haloacryloyl; unsubstituted β-sulfato-propionyl; and unsubstituted β-oxethyl-sulfone sulfuric acid semi-ester; wherein said halo group is chloro or bromo.

3. The dyestuff of the formula:

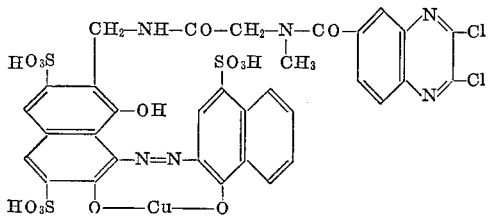

4. The dyestuff of claim 1 having the formula:

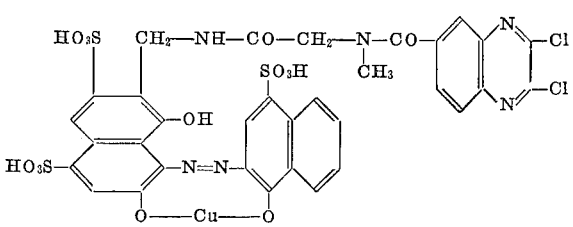

5. The dyestuff of claim 1 having the formula:

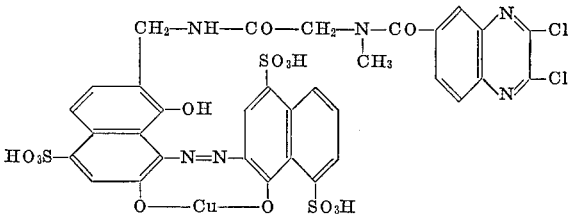

6. The dyestuff of claim 1 having the formula:

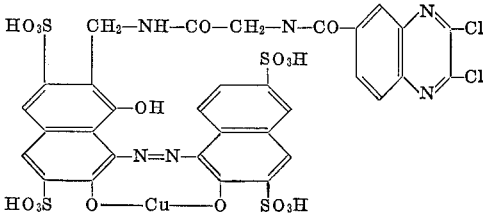

7. The dyestuff of claim 1 having the formula:

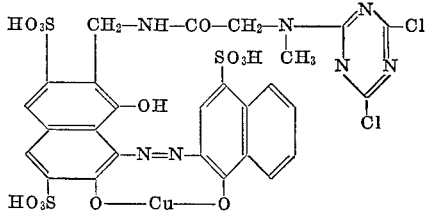

References Cited
UNITED STATES PATENTS 3,268,505  8/1966  Schundehutte et al. ___ 260—146
3,336,284  8/1967  Jager et al. _____ 260—154

CHARLES R. PARKER, Primary Examiner

D. M. PAPUGA, Assistant Examiner

U.S. Cl. X.R.

8—42, 51, 54.2, 55; 260—147, 150, 151, 194, 195

UNITED STATES PATENT OFFICE
CERTIFICATE OF CORRECTION

Patent No. 3,585,181      Dated June 15, 1971

Inventor(s) HORST JAGER, ET AL.

It is certified that error appears in the above-identified patent and that said Letters Patent are hereby corrected as shown below:

| Column | Line | Error |
|---|---|---|
| 5 | 65 | " 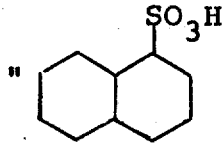 " should be -- 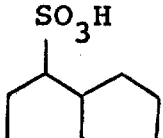 -- |
| 6 | 5 | " 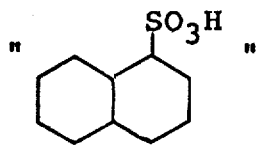 " should be -- 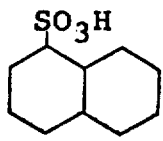 -- |
| 6 | 14 | "SO H" should be -- $SO_3H$ --. |
| 6 | 75 | " 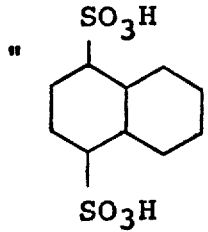 " should be -- 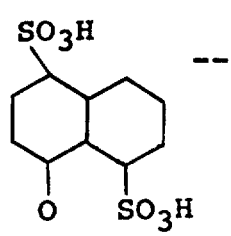 -- |
| 7 | 51 | "$HO_2S$" should be -- $HO_3S$ --. |
| 8 | 25 | "coopering" should be -- coppering --. |
| 8 | 52 | "pyridine" should be -- pyrimidine --. |
| 9 | Claim 2 | "  " should be --  --. |

UNITED STATES PATENT OFFICE
CERTIFICATE OF CORRECTION

Page 2

Patent No. 3,585,181                    Dated June 15, 1971

Inventor(s) HORST JAGER, ET AL.

It is certified that error appears in the above-identified patent and that said Letters Patent are hereby corrected as shown below:

| Column | Line | Error |
|---|---|---|
| 10 | 18 (Claim 4) | "of claim 1" should be deleted. |
| 10 | 29 (Claim 5) | "of claim 1" should be deleted. |
| 10 | 40 (Claim 6) | "of claim 1" should be deleted. |
| 10 | 50 (Claim 7) | "of claim 1" should be deleted. |
| 10 | Claim 6 | "-N-CO" should be -- -N-CO- -- <br>                                                            $CH_3$ |
| 10 | Claim 7 | 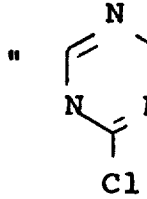 should be -- 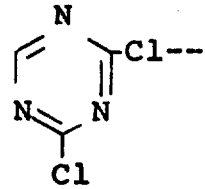 -- |

Signed and sealed this 30th day of May 1972.

(SEAL)
Attest:

EDWARD M. FLETCHER, JR.
Attesting Officer

ROBERT GOTTSCHALK
Commissioner of Patents